(12) United States Patent
Featherston et al.

(10) Patent No.: US 9,503,183 B2
(45) Date of Patent: Nov. 22, 2016

(54) FREE SPACE OPTICAL TRANSCEIVER

(71) Applicants: John Featherston, Fort Wayne, IN (US); Christopher A. Archer, Fort Wayne, IN (US); James M. Cicchiello, Fort Wayne, IN (US); Frederick D. Bean, Fort Wayne, IN (US)

(72) Inventors: John Featherston, Fort Wayne, IN (US); Christopher A. Archer, Fort Wayne, IN (US); James M. Cicchiello, Fort Wayne, IN (US); Frederick D. Bean, Fort Wayne, IN (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 134 days.

(21) Appl. No.: 14/132,932

(22) Filed: Dec. 18, 2013

(65) Prior Publication Data

US 2015/0171968 A1 Jun. 18, 2015

(51) Int. Cl.
*H04B 10/00* (2013.01)
*H04B 10/112* (2013.01)

(52) U.S. Cl.
CPC ................ *H04B 10/1123* (2013.01)

(58) Field of Classification Search
CPC ............... H04B 10/40; H04B 10/11
USPC .................................. 398/118–131
See application file for complete search history.

(56) References Cited

U.S. PATENT DOCUMENTS

| | | | |
|---|---|---|---|
| 6,285,481 B1 * | 9/2001 | Palmer | H04B 10/118 398/119 |
| 7,277,644 B2 * | 10/2007 | Johnson | H03M 13/1515 398/118 |
| 7,995,489 B2 * | 8/2011 | Ayyagari | H04W 40/24 370/252 |
| 8,442,023 B2 * | 5/2013 | Ghanadan et al. | 370/347 |
| 8,842,995 B2 * | 9/2014 | Chan | H04B 10/807 398/118 |
| 2004/0037566 A1 * | 2/2004 | Willebrand | H04B 10/114 398/115 |
| 2015/0171968 A1 * | 6/2015 | Featherston | H04B 10/1123 398/118 |

FOREIGN PATENT DOCUMENTS

WO WO 2012/041403 A1 4/2012

OTHER PUBLICATIONS

Haixiang Shi Lipo Wang Sch. of Electr. & Electron. Eng., Nanyang Technol. Univ., Singapore Neural Networks, 2005. IJCNN '05. Proceedings. 2005 IEEE International Joint Conference on A hybrid neural network for optimal TDMA transmission scheduling in packet radio networks.*

A mixed neural-genetic algorithm for the broadcast scheduling problem Salcedo-Sanz, S.; Bousono-Calzon, C.; Figueiras-Vidal, A.R.; Dept. of Signal Theor. & Commun., Univ. Carlos de Madrid, Leganes-Madrid, Spain Wireless Communications, IEEE Transactions on Mar. 10, 2003 vol. 2, Issue:2; pp. 277-283.*

* cited by examiner

*Primary Examiner* — Danny Leung
(74) *Attorney, Agent, or Firm* — Tarolli, Sundheim, Covell & Tummino LLP

(57) ABSTRACT

A free-space optical (FSO) transceiver can include a link predictor configured to estimate conditions for an FSO link over a window of time in the future. The FSO transceiver can also include a scheduler configured to assign outgoing packets to blocks of time in the window of time based on quality of service (QoS) parameters of each of the outgoing packets and on conditions in each block of time in the window of time.

21 Claims, 9 Drawing Sheets

FREE SPACE OPTICAL TRANSCEIVER

TECHNICAL FIELD

This disclosure relates to a free space optical (FSO) transceiver. More particularly, this disclosure relates to an FSO transceiver that includes a scheduler to assign packets to blocks of time in a window of time.

BACKGROUND

Free-space optical (FSO) communication is an optical communication technology that employs light propagating in free space to transmit data for telecommunications and/or computer networking. "Free space" can mean air, outer space, a vacuum, water, etc. FSO contrasts with using a solid medium such as optical fiber cable or an optical transmission line that constrains the dispersion of photons. FSO can be useful where physical connections are impractical due to high costs and/or other considerations.

Quality of service (QoS) can refer to several related aspects of computer networks that allow the transport of network traffic with specific parameters. In particular, much technology has been developed to allow computer networks to become as useful as telephone networks for audio and/or video conversations, as well as supporting new applications with strict service demands, such as video on demand services.

SUMMARY

In one example, a free-space optical (FSO) transceiver can include a link predictor configured to estimate conditions for an FSO link over a window of time in the future. The FSO transceiver can also include a scheduler configured to assign outgoing packets to blocks of time in the window of time based on quality of service (QoS) parameters of each of the outgoing packets and on conditions estimated for each block of time in the window of time.

In another example, a system can include a first FSO transceiver configured to estimate seeing conditions over an FSO link for a window of time in the future. The first FSO transceiver can also be configured to assign the network packets in a plurality of queues, wherein each of the plurality of queues stores network packets with similar quality parameters, to blocks of time in the window of time based on the estimated conditions and on QoS parameters of the network packets in each of the plurality of queues over the FSO link during the window of time. The system can also include a second FSO transceiver separated by free space from the first FSO transceiver. The second FSO transceiver can be configured to receive the network packets transmitted over the FSO link and provide the network packets to a network.

In yet another example, a method can include estimating conditions of a FSO link for a window of time in the future. The method can further include assigning network packets stored in a plurality of queues, wherein each of the plurality of queues stores network packets with similar quality parameters, to blocks of time in the based on the seeing conditions and QoS parameters of the network packets in each of the plurality of queues.

DETAILED DESCRIPTION

This disclosure relates to a system that can control transmission of packets over a free space optical (FSO) link. The FSO link can directly communicatively couple a first FOS transceiver to a second FSO transceiver. Each of the first and second FSO transceivers can be coupled to networks that can provide network packets for transmission over the FSO link. Each of the first and second FSO transceivers can include a link predictor that can estimate seeing conditions of the FSO link for a window of time in the future. Each FSO transceiver can include a scheduler that can assign packets stored in a plurality of queues to blocks of time in the window of time based on the estimated seeing conditions as well as quality of service (QoS) parameters defined by the packets in each of the plurality of queues. Each FSO transceiver can include a process to partition data streams from a network and/or communications port(s) into a plurality of queues. Further, each FSO transceiver can transmit the packets over the FSO link during the blocks of time in the window of time.

By employing this system, the effects of network fade due to atmospheric scintillation, tracking anomalies, or other effects, such as intermittent beam blockages, can be reduced. Employment of this system can also be employed to ensure that information prioritization, quality, and throughput, as well as other parameters can be maintained across a statistically varying (stationary or non stationary), lossy, FSO communications channel (e.g., the FSO link). This system can be employed to facilitate unidirectional or cooperative bidirectional QoS prediction, scheduling, optimization and/or operation.

Figure 1:
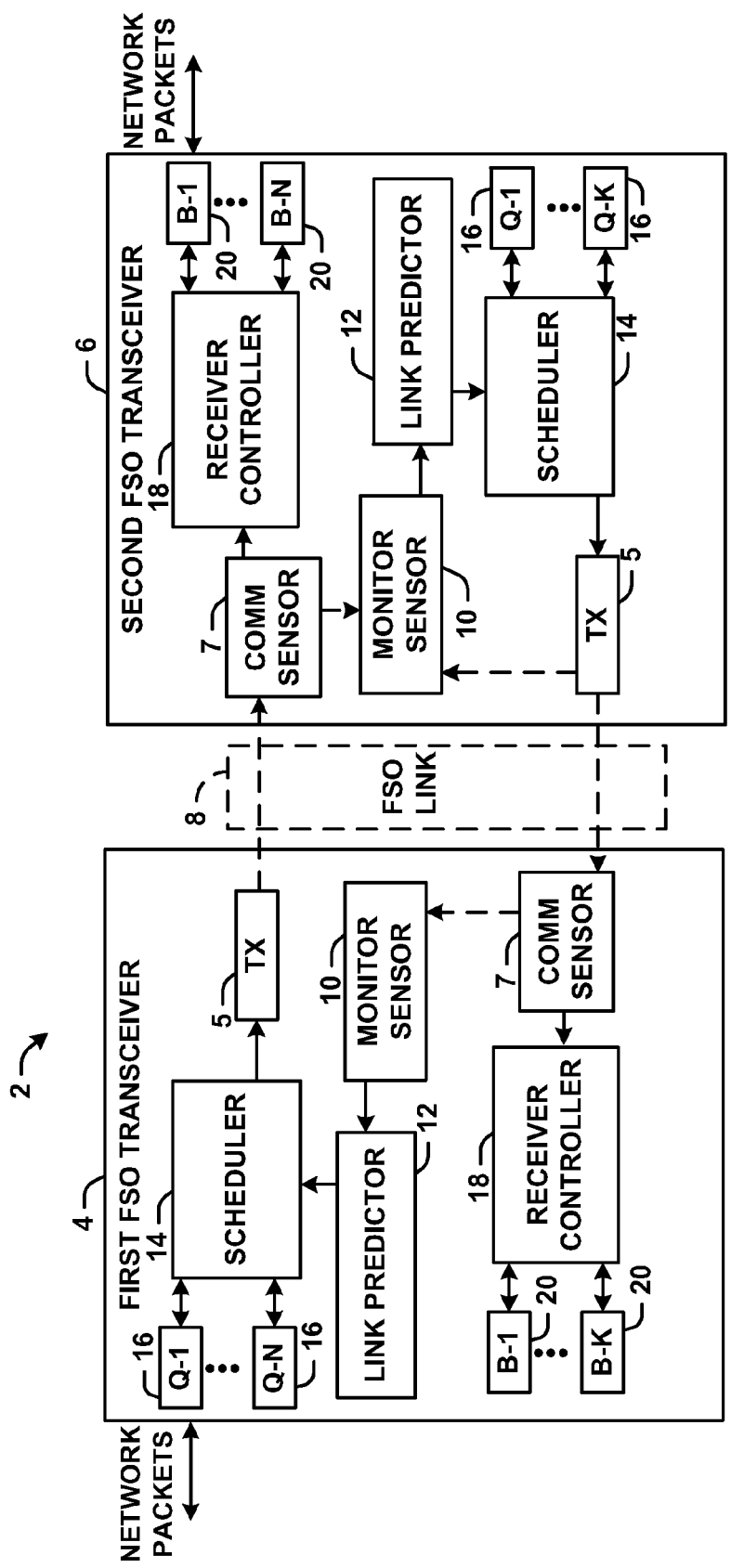
FIG. 1 illustrates an example of a system for controlling transmission of packets over a free space optical (FSO) link.

FIG. 1 illustrates an example of a system 2 with a first FSO transceiver 4 and a second FSO transceiver 6. Each of the first and second FSO transceivers 4 and 6 can provide and receive optical signals through an FSO link 8. Each of the first and second FSO transceivers 4 and 6 can include a transmitter 5 (e.g., a laser) and a communication sensor 7, such as a receiver (e.g., a photodetector, such as a photodiode). The communication sensor can have a relatively high data rate (e.g., one or more Gigabits per second). The first and second FSO transceivers 4 and 6 can optically communicate over free space, such as air, a vacuum, etc. Thus, the first and second FSO transceivers 4 and 6 can be separated by between about several meters to distances of about 40 km or more. Moreover, the first and second FSO transceivers 4 and 6 can have a direct line of sight. In one example, the first and second FSO transceivers 4 and 6 can be fixed atop buildings. The FSO link 8 can include a communication link from the transmitter 5 of the first FSO transceiver 4 to the communication sensor 7 of the second FSO transceiver 6. Additionally, the FSO link 8 can include a communication link from the transmitter 5 of the second FSO transceiver 6 to the communication sensor 7 of the first FSO transceiver 4. Thus, the FSO link 8 can represent a bi-directional communication link.

The first FSO transceiver 4 and the second FSO transceiver 6 can each receive network packets, such as outgoing network packets from a local area network (LAN). The outgoing network packets can be, for example, Ethernet frames (e.g., a series of Ethernet frames) that are destined for nodes of the LAN across the FSO link 8. Components of the first FSO transceiver 4 and the second FSO transceiver 6 can be implemented as hardware (e.g., a microcontroller, a field programmable gate array, an application specific integrated circuit chip, etc.), software (e.g., instructions executing on a processor) or a combination thereof.

Figure 2:
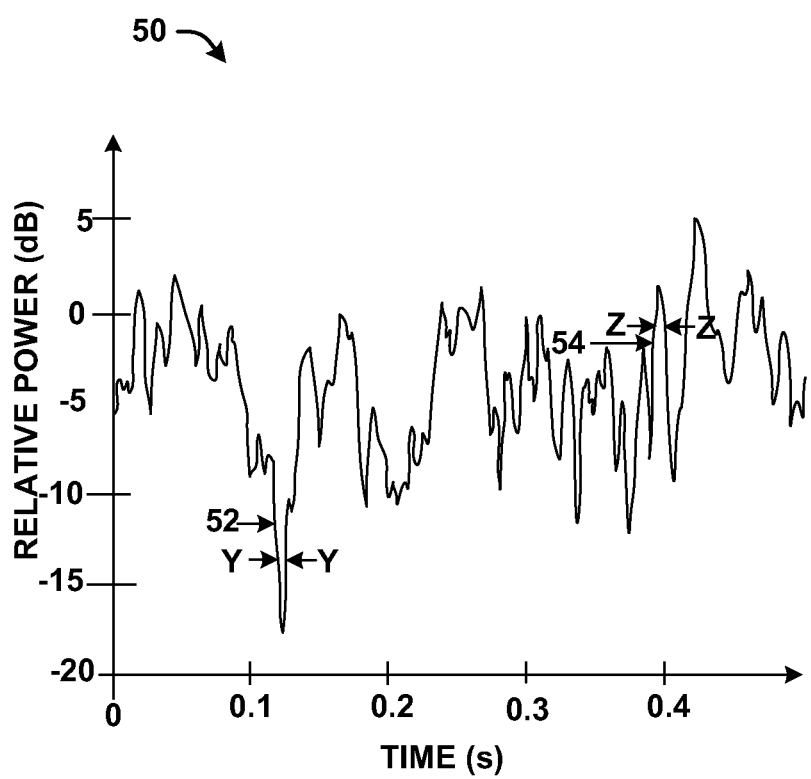
FIG. 2 illustrates an example of a graph illustrating a detected power of an incoming signal.

In some examples, the first FSO transceiver 4 and the second FSO transceiver 6 can each include a monitor sensor 10 that can be configured to measure power of an incoming signal provided by the transmitter 5 of the second FSO transceiver 6. The monitor sensor 10 can have an integrated optical detector, or can rely on receiving an electrical signal from the communication sensor 7. A response time of the monitor sensor 10 can be adjusted to dynamically match seeing conditions, including relatively long integration response time. FIG. 2 illustrates an example of a graph 50 depicting an example of the power detected by the monitor sensor 10 of FIG. 1. In some examples, the incoming signal can be provided from the communication sensor 7. For instance, in such examples, the communication sensor 7 can include a beam splitter to split the incoming signal between the communication sensor 7 and the monitor sensor 10. In some examples, both the first FSO transceiver 4 and the second FSO transceiver 6 can share a single monitor sensor 10. In such a situation, a data characterizing a measured power signal can be transmitted through the FSO link 8.

In FIG. 2, the power, in decibels (dB) of the incoming signal is plotted as a function of time, in seconds (s). The power output by the second FSO transceiver 6 can be relatively constant, such that the fluctuations in power detected by the monitor sensor 10 at the first FSO transceiver 4 can vary based on internal tracking degradations, or external degradations including atmospheric scintillation or other beam blockages in the free space between the first FSO transceiver 4 and the second FSO transceiver 6. The atmospheric scintillation (or other blockages) can change based on a number of factors, including a heat index, wind turbulence, cloud coverage, etc.

Referring back to FIG. 1, the monitor sensor 10 can provide the power of the incoming signal to a link predictor 12 that can calculate a probability of an upcoming packet drop for each block of time in a window of time. The window of time can be a time from the present time to in the near future (e.g., 0.5 seconds into the future), such that the window of time can be a "look-ahead" window of time. The calculation can be based, for example, on a slope of the power detected at the monitor sensor 10. For instance, in FIG. 2, at a given point in time, 52, the slope of the power detected by the monitor sensor 10 has a relatively steep decline. Moreover, at the arrows Y-Y, the power detected by the monitor sensor 10 can drop to a level below a tolerable limit, which can cause a network fade, during which no data can be transmitted over the FSO link 8. The link predictor 12 can be configured to estimate a duration of a network fade (e.g., the time during the arrows Y-Y of FIG. 2) based on the slope of the power detected by the monitor sensor 10 at the time 52 (e.g., a derivative of the power detected by the monitor sensor 10).

Similarly, as illustrated in FIG. 2, at another point in time 54, the power detected by the monitor sensor 10 has a relatively steep incline. Moreover, at the arrows, Z-Z, the power detected by the monitor sensor 10 can be relatively high, which can be indicative of a network burst, which can be relatively high incoming quality signal (e.g., low attenuation) being detected. Referring back to FIG. 1, the link predictor 12 can be configured to estimate a duration of a network burst (e.g., the time during the arrows Z-Z of FIG. 2) based on the slope of the power detected by the monitor sensor 10 at the time 54 (e.g., a derivative of the power detected by the monitor sensor 10). In this manner, the seeing conditions over the window of time can characterize the probability of an upcoming packet drop over the duration of the window of time.

The first FSO transceiver 4 can include a scheduler 14 that can assign each outgoing packet to one of N number of queues 16, where N is an integer greater than or equal to one. Each packet can have quality of service (QoS) parameters that can be defined and/or determined from headers in the packets. Each of the N number of queues 16 can hold packets for a given set of QoS parameters waiting for transmission via the FSO link 8. Accordingly, each packet transmitted from the given set of QoS parameters can be assigned to the same queue or an alternate queue as determined by QoS parameters. Accordingly, each of the N number of queues 16 can have packets with the same (or similar) QoS parameters. The QoS parameters can define, for example, a desired throughput, latency, jitter and priority of each data packet as well as other characteristics of each data packet. In some examples, the scheduler 14 can determine the QoS parameters by identifying a type of content in the data packets (e.g., real-time voice data, file transfers, remote desktops, etc.).

The scheduler 14 can include a transmission algorithm (e.g., a transmission schedule algorithm) that can determine how blocks of time in the time window are assigned for transmission of the packets in the N number of queues 16 over the FSO link 8. In some examples, the transmission algorithm can be a machine learning algorithm, such as a genetic algorithm or a neural network. In other examples, the transmission algorithm can be a set of predefined rules. The transmission algorithm can be programmed to maximize a quality, priority and probability product ("Q*P*Pr") for packets transmitted over the FSO link 8. The quality, priority and probability product can be determined by matching data transmission characteristics with QoS parameters of the packets stored in the N number of queues 16. In some examples, to determine how blocks of time are assigned, the transmission algorithm can employ parameters such as depth of fade, acceptable latency for a packet, information priority retransmission attempts and/or other parameters that can be associated with QoS.

FIGS. 3-6 illustrates an example of assigning packets from 4 different queues 150 (e.g., the N number of queues 16 illustrated in FIG. 1) to blocks of time 152 in a window of time 154. The assigning could be implemented, for example, by the scheduler 14 of FIG. 1. For purposes of simplification of explanation, FIGS. 3-6 employ the same reference numbers to denote the same structure. In FIG. 3-6, the window of time has 20 blocks of time, labeled 1-20, but in other examples, more or less blocks of time could be employed. Block 1 can be representative of the block of time beginning at the present time ("NOW") and block 20 can be representative of the block of time in the future at the end of the window of time.

Additionally, FIGS. 3-6 illustrate a graph 156 depicting an estimated probability of an upcoming packet drop (labeled in FIG. 2 as "PROB OF DROP") in percentage (%) plotted as a function of time in the window of time. The graph can be determined, for example, by the link predictor 12 illustrated in FIG. 1.

In the example illustrated in FIGS. 3-6, a first queue ("Q-1") can have packets with QoS parameters indicating that the packets have a low latency and a low priority. In this example, a second queue ("Q-2") can have packets with parameters indicating that the packets have a high throughput and high priority. Moreover, a third queue ("Q-3") can have packets with parameters indicating that the packets have a low latency and a high priority. Additionally, a fourth queue ("Q-4") can have packets with parameters indicating that the packets have a low jitter and mid-priority. In some examples, the queues 150 can store packets from different data streams with the same or similar quality parameters. Additionally or alternatively, packets within the same data pipe (e.g., packets from the same data source) that have different QoS parameters can be stored in different queues 150.

Figure 3:
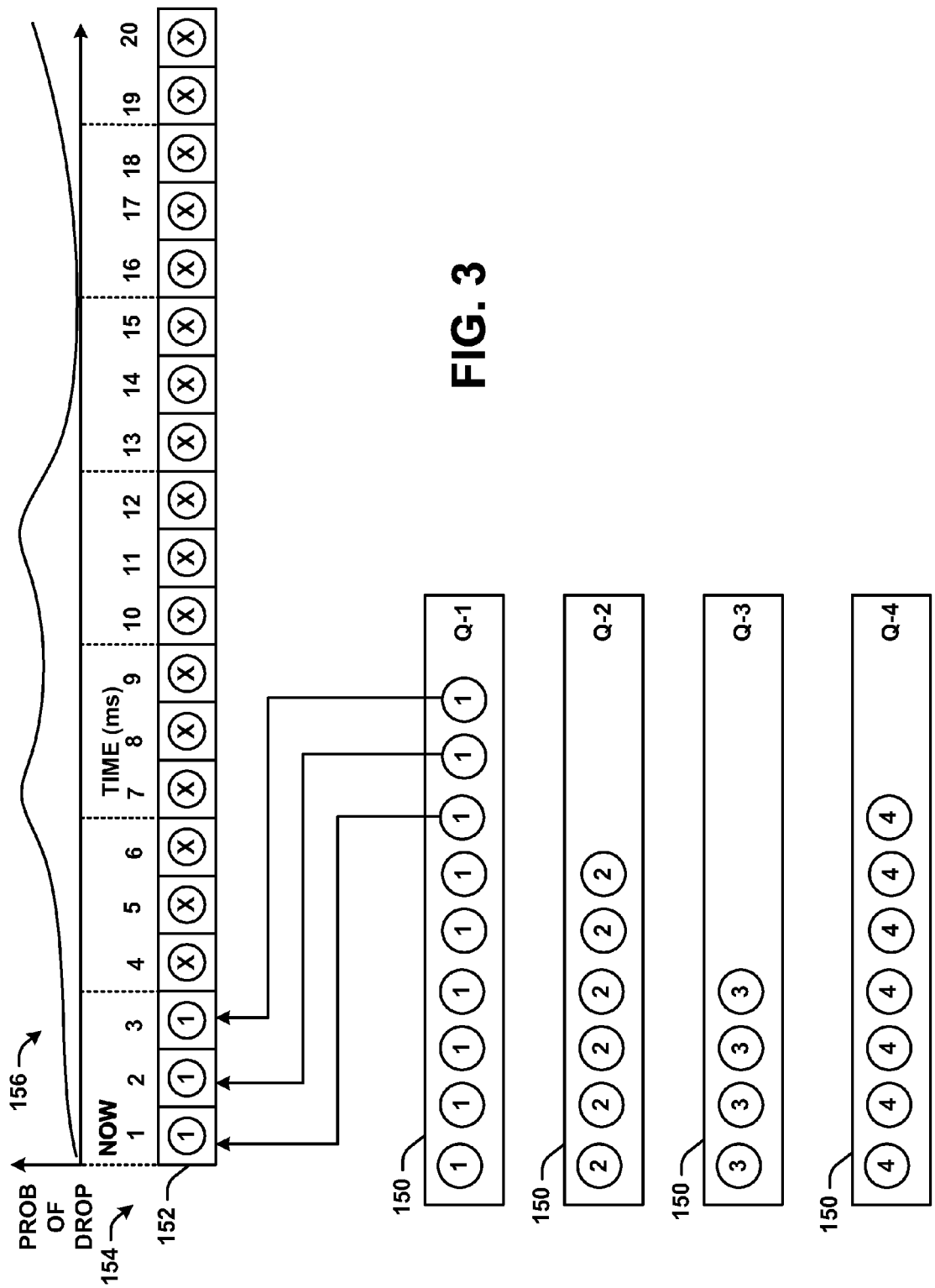
FIGS. 3-6 illustrate an example of a scheduler assigning packets to blocks of time in a window of time.

As illustrated in FIG. 3, the scheduler 14 can assign packets in Q-1 to blocks of time 1, 2 and 3 of the window of time. The scheduler 14 can select blocks of time 1, 2 and 3 based on the estimated probability of an upcoming packet drop (e.g., the seeing conditions) during the blocks of time 1, 2 and 3 and the QoS parameters of the packets stored in Q-1. Additionally, the QoS parameters of the packets stored in Q-2, Q-3 and Q-4 can also be considered. In particular, the scheduler 14 can be configured to select the blocks of time 1, 2 and 3 for the packets in Q-1 based on the QoS parameters to fit low latency data of low priority during a time a network fade is starting to recover. During blocks of time 1, 2 and 3, some (or all) of the packets in Q-1 may be lost during transmission over a free space. However, since the packets in Q-1 have a low priority, resending the packets should not significantly affect the overall quality of the link.

Figure 4:
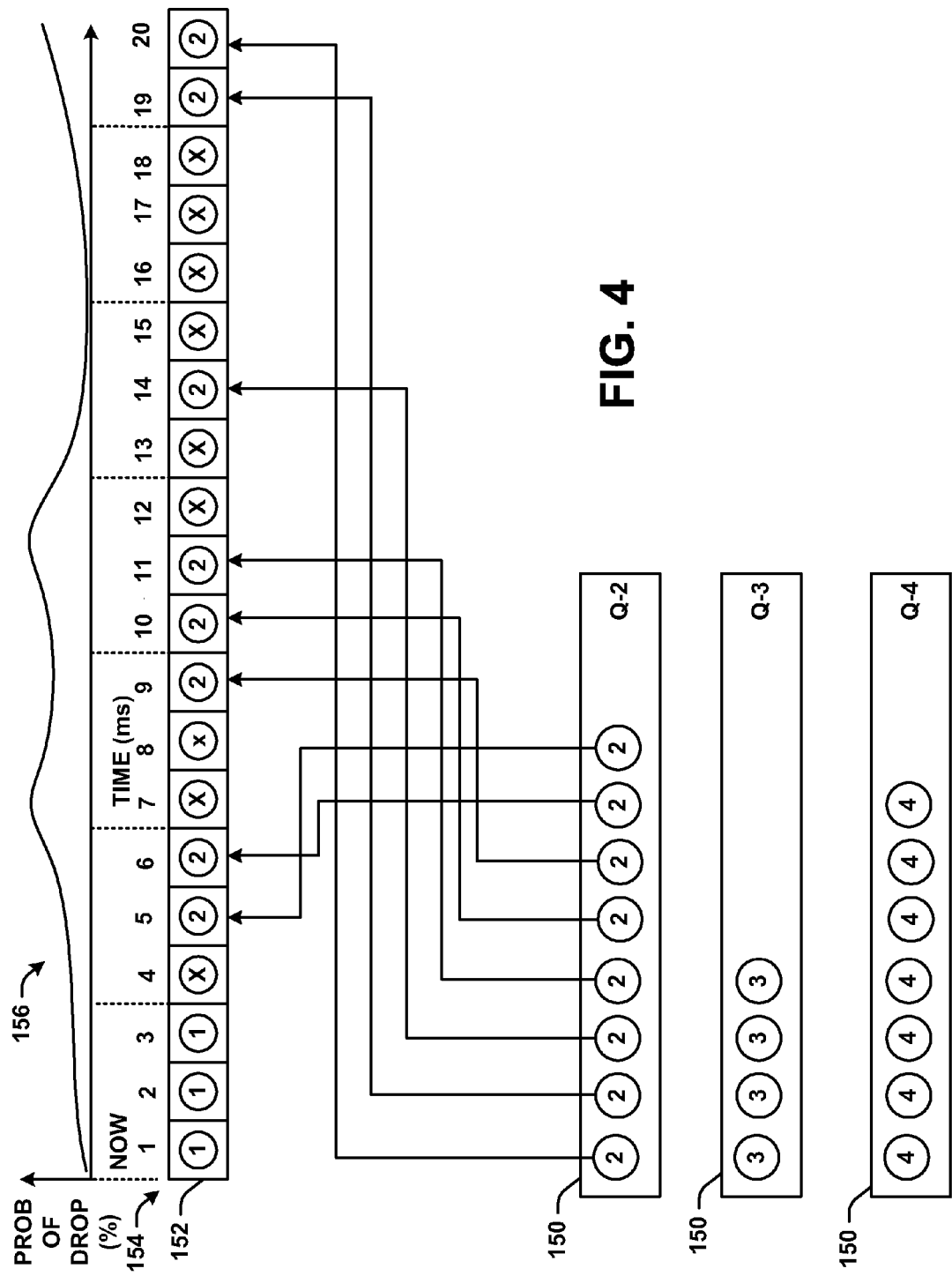

As illustrated in FIG. 4, the scheduler 14 can assign packets in Q-2 to blocks of time 5, 6, 9-11, 14, 19 and 20 of the window of time. The scheduler 14 can select blocks of time 5, 6, 9-11, 14, 19 and 20 based on the estimated probability of an upcoming packet drop (e.g., the seeing conditions) during the blocks of time 5, 6, 9-11, 14, 19 and 20 and the QoS parameters of the packets stored in Q-2. Additionally, the QoS parameters of the packets stored in Q-1, Q-3 and Q-4 can also be considered. In particular, the scheduler 14 can be configured to select the blocks of time 5, 6, 9-11, 14, 19 and 20 for the packets in Q-2 based on the QoS parameters to provide high throughput, high priority data. During blocks of time 5, 6, 9-11, 14, 19 and 20, there is a relatively low estimated probability of an upcoming packet drop, thereby indicating blocks of time with reliable transmission windows.

Figure 5:
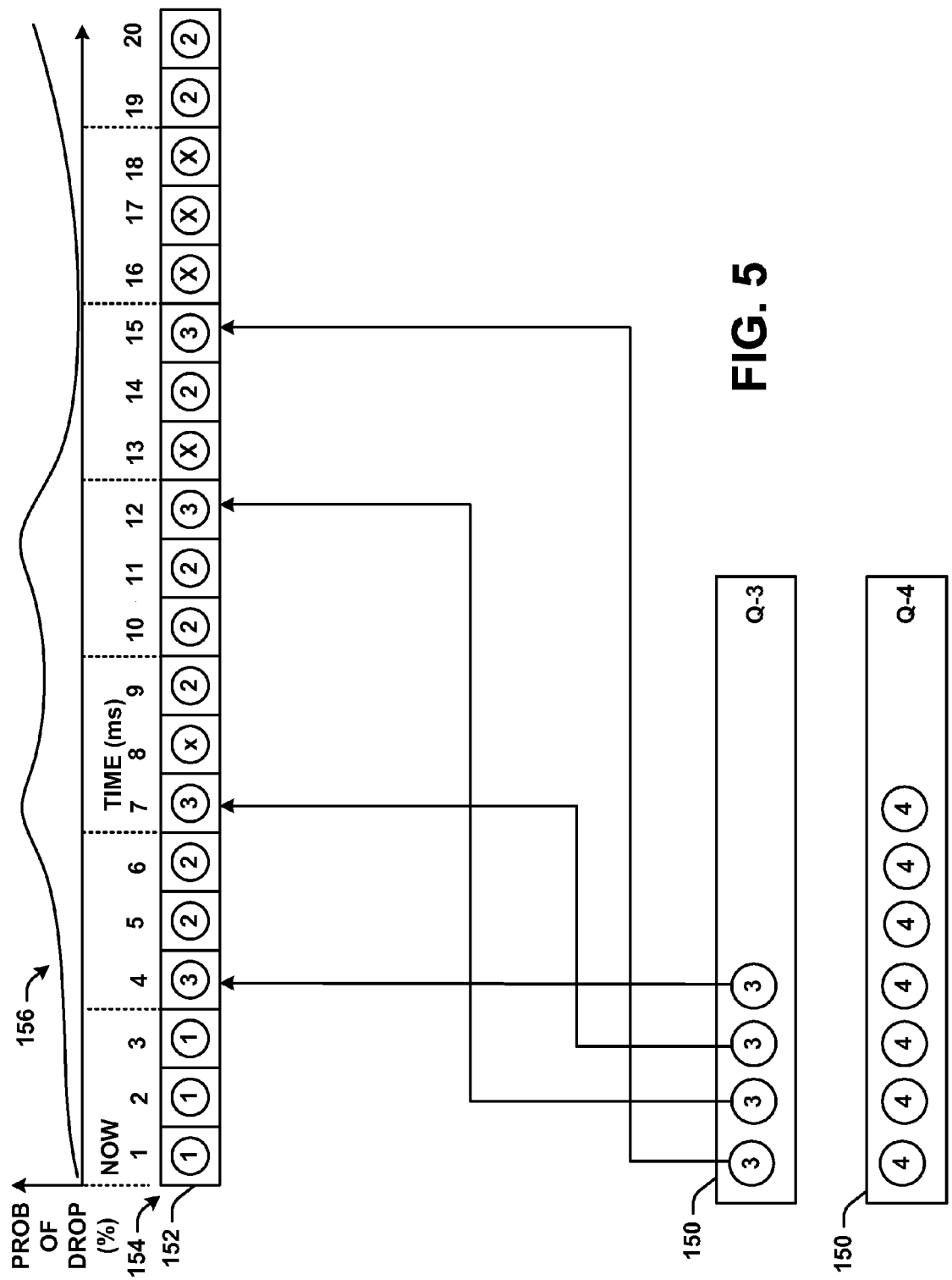

As illustrated in FIG. 5, the scheduler 14 can assign packets in Q-3 to blocks of time 3, 7, 12 and 15 of the window of time. The scheduler 14 can select blocks of time 3, 7, 12 and 15 based on the estimated probability of an upcoming packet drop (e.g., the seeing conditions) during the blocks of time 3, 7, 12 and 15 and the QoS parameters of the packets stored in Q-3. Additionally, the QoS parameters of the packets stored in Q-1, Q-2 and Q-4 can also be considered. In particular, the scheduler 14 can be configured to select the blocks of time 3, 7, 12 and 15 for the packets in Q-3 based on the QoS parameters to provide low latency, high priority data that needs to be sent relatively quickly during windows of opportunity.

Figure 6:
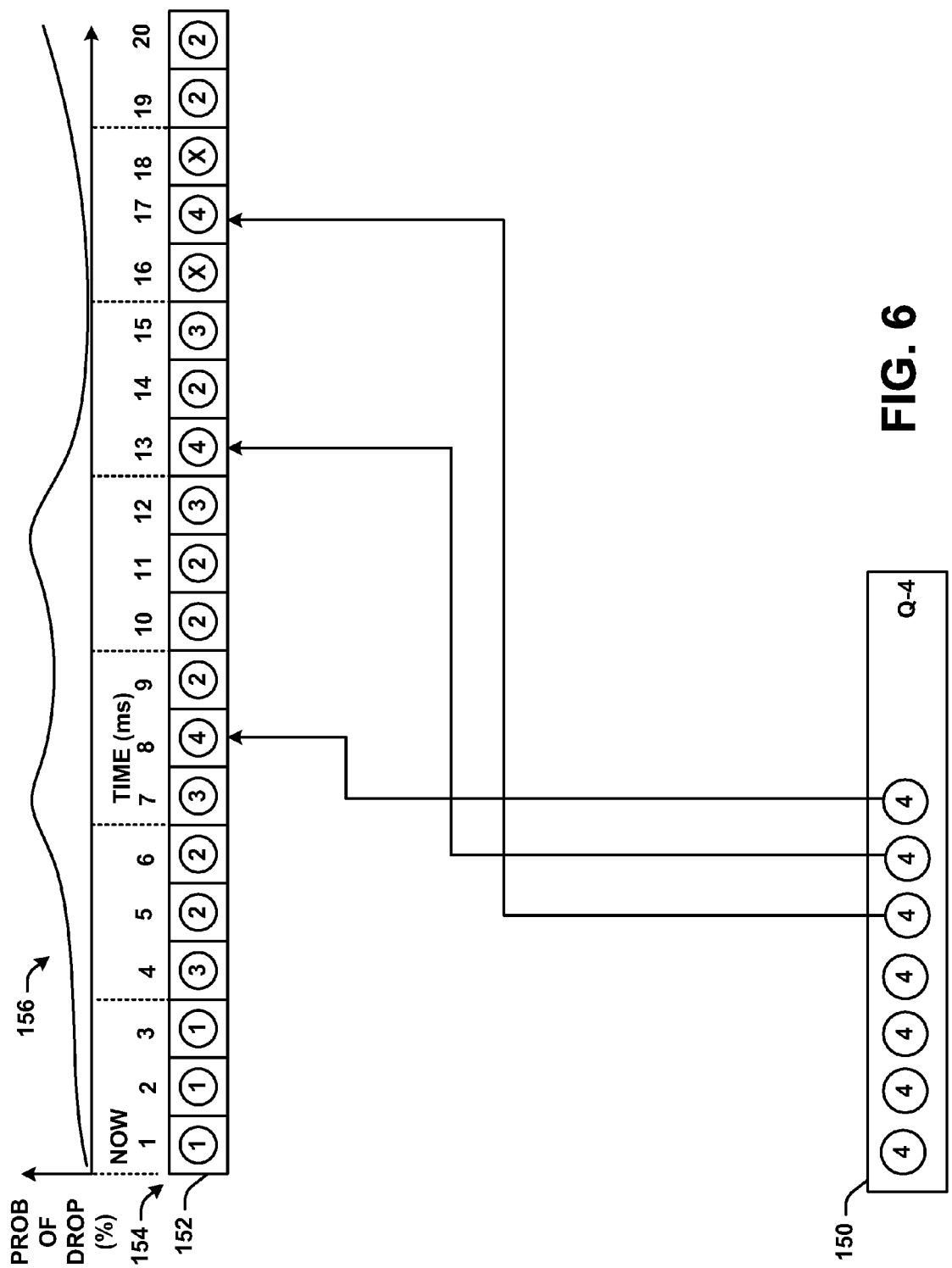

As illustrated in FIG. 6, the scheduler 14 can assign packets in Q-4 to blocks of time 8, 13 and 17 of the window of time. The scheduler 14 can select blocks of time 8, 13 and 17 based on the estimated probability of an upcoming packet drop (e.g., the seeing conditions) during the blocks of time 8, 13 and 17 and the QoS parameters of the packets stored in Q-3. Additionally, the QoS parameters of the packets stored in Q-1, Q-2 and Q-3 can also be considered. In particular, the scheduler 14 can be configured to select the blocks of time 8, 13 and 14 for the packets in Q-4 based on the QoS parameters to provide low jitter, mid priority data that should be sent at regular intervals to reduce jitter. Additionally, as is illustrated in FIG. 6, blocks of time 16 and 18 may have no packets assigned thereto. By not transmitting during times a network fade, the overall link performance is optimized since data will not have to be retransmitted after being potentially dropped.

Referring back to FIG. 1, upon transmission of the packets in the N number of queues 16, the communication sensor 7 at the second FSO transceiver 6 can receive the outgoing packets, which can be referred to as incoming packets with respect to the second FSO transceiver 6. The second FSO transceiver 6 can include a communication sensor controller 18 that can store each of the incoming packets in one of N number of buffers 20. Each of the N number of buffers can store packets with similar parameters from different queues. Moreover, packets in each of the N number of buffers 20 can be provided as incoming packets of the network packets of the FSO transceiver. Further, upon transmission of the network packet, the link predictor 12 can update the estimate of the seeing conditions for the window of time in the future, such that the process of transmission of packets over the FSO link 8 can be managed in real time. It is to be noted that in some examples, only one buffer 20 may be employed. In such of situation, the single buffer 20 can store packets with different QoS parameters and the stored packets can be provided as incoming packets of the networks of the FSO transceiver.

In reverse, outgoing network packets can be received at the second FSO transceiver 6. The second FSO transceiver 6 can also include a scheduler 14 that can store the outgoing packets in K number of queues 16, where K is an integer greater than or equal to one. In some examples, the second FSO transceiver 6 can include a link predictor 12 to determine seeing conditions of the FSO link 8. In other examples, the seeing conditions can be provided from the first FSO transceiver 4 via the FSO link 8 or another link (e.g., a "soda straw" radio frequency (RF) pipe) depending on the network architecture to facilitate a cooperative bidirectional QoS prediction. The scheduler 14 can transmit the outgoing packets in the K number of queues 16 through the FSO link 8 in a manner described with respect to FIGS. 3-6. Moreover, the communication sensor 7 of the first FSO transceiver 4 can receive the outgoing packets provided via the FSO link 8, which can be incoming packets from the perspective of the first FSO transceiver 4. The first FSO transceiver 4 can include a communication sensor controller 18 that can store the incoming packets in K number of buffers 20. The incoming packets can be output as network packets from the first FSO transceiver 4.

The FSO link 8 can have a high bandwidth, such that packets are transferred over the FSO link 8 in the nanosecond time scale. In contrast, as illustrated in FIG. 2, the internal or external signal reception losses, including losses due to atmospheric scintillation (or other blockages), change on a much slower time scale (e.g., the millisecond time scale). Accordingly, the system 2 can be configured to control transmission of the network packets over the FSO link 8 at a time scale faster than the atmospheric scintillation can change. Thus, by employing the system 2 of FIG. 1, the available throughput of the FSO link 8 can be fully leveraged since the upper frequency limit of atmospheric scintillation for a typical FSO link 8 would only be on the order of hundreds of Hertz. Moreover, packets with different QoS parameters can be serviced differently to minimize the impact of atmospheric scintillation that can cause network fades. Specifically, as illustrated in FIGS. 3-6, the scheduler 14 can make real time adjustments to assign packets from with similar QoS parameters to specific blocks of time.

Figure 7:
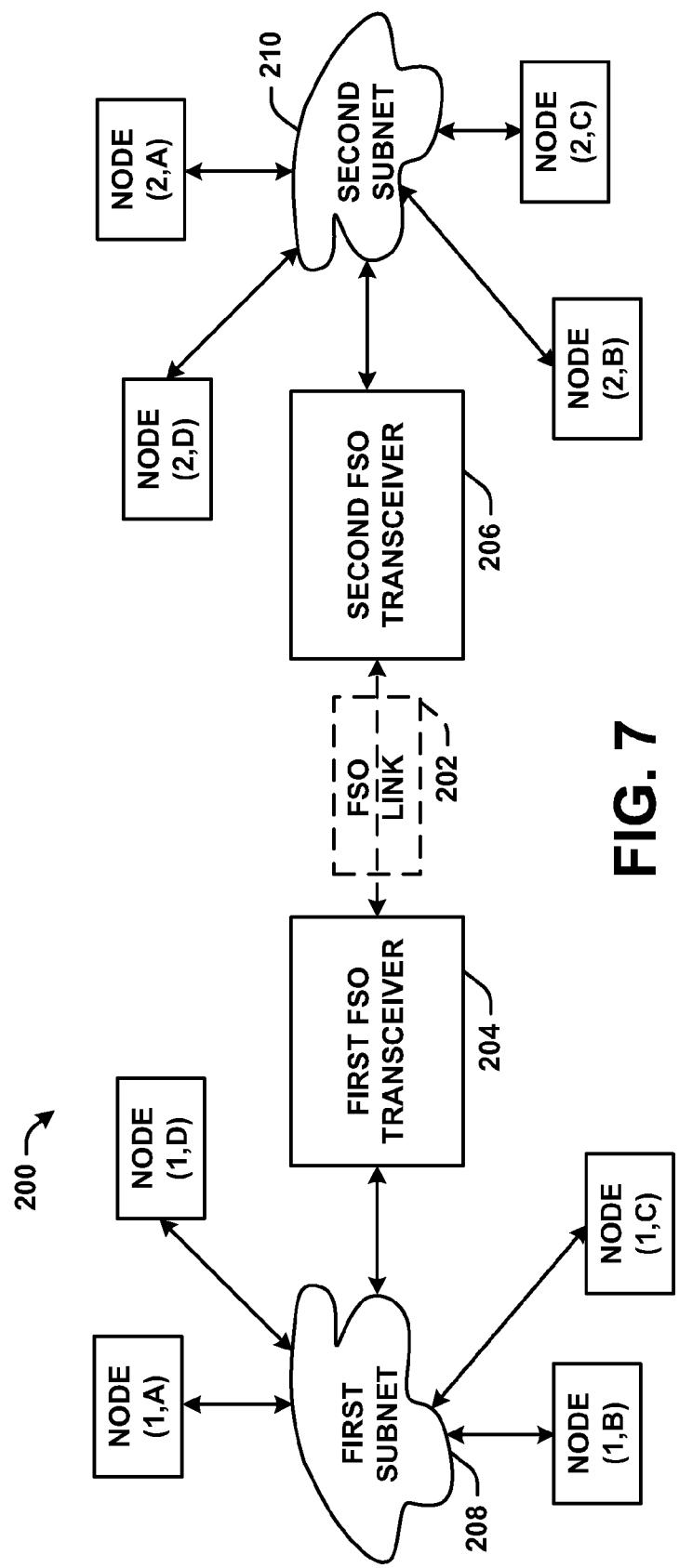
FIG. 7 illustrates another example of a system for controlling transmission of packets over an FSO link.

FIG. 7 illustrates an example of a system 200 with a FSO link 202 that couples a first FSO transceiver 204 with a second FSO transceiver 206 that could be employed to implement the system 2 of FIG. 1. The first and second FSO transceivers 204 and 206 could be implemented, for example, in a manner similar to the first or second FSO transceivers 4 and 6 of FIG. 1.

The first FSO transceiver 204 can communicate with a first subnet 208 of a network and the second FSO transceiver 206 can communicate with a second subnet 210 of the network that are separated by free space (e.g., from about several meters to about 40 kilometers or more). The FSO link 202 can provide a data bridge between the first subnet 208 and the second subnet 210 of the network. In this manner, any node on the first subnet 208 of the network can communicate with any node on the second subnet 210 of the network (and vice versa) via the FSO link 202. Each of the first and second subnets 208 and 210 of the network can be LANs, such as Ethernet networks. In other examples, the first subnet 208 and the second subnet 210 can be configured as independent networks, such as a wide area network (WAN) or another communication system.

Figure 8:
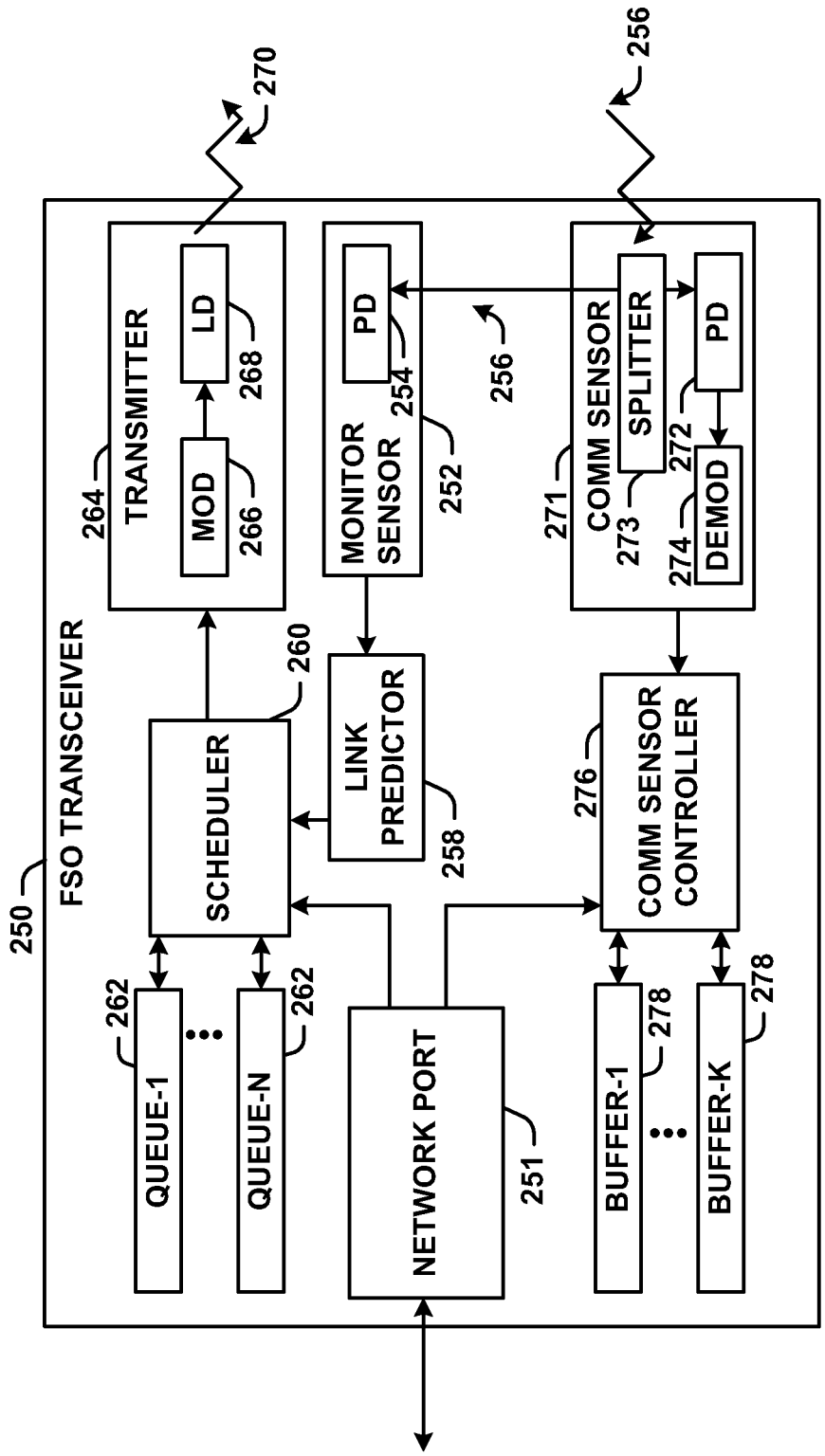
FIG. 8 illustrates an example of an FSO transceiver.

Each of the first and second FSO transceivers 204 and 206 can be implemented as an FSO transceiver 250 illustrated in FIG. 8. For purposes of simplification of explanation, the components of the FSO transceiver 250 are illustrated and described as being implemented on a single unit. However, in other examples, the components of the FSO transceiver 250 can span multiple interconnected units. Moreover, the components of the FSO transceiver 250 can be implemented as hardware (e.g., a microcontroller, a field programmable gate array, an application specific integrated circuit chip, etc.), software (e.g., instructions executing on a processor) or a combination thereof. The FSO transceiver 250 can include a network port 251, such as an Ethernet port. The network port 251 can be coupled to a LAN. For example, the network port 251 can be coupled to a network router or a network switch. In this manner, the FSO transceiver 250 can achieve bi-directional communication with the LAN.

The FSO transceiver 250 can include a monitor sensor 252 that can include an internally integrated photodetector 254 (e.g., a photodiode). The monitor sensor 252 can be configured to provide a measurement of optical power detected in an incoming signal 256. The incoming signal 256 can be an optical signal that can be propagated by another FSO transceiver 250 across free space. In one example, the measurements detected by the monitor sensor 252 could be similar to the graph 50 illustrated in FIG. 2.

The monitor sensor 252 can provide the measured power to a link predictor 258. The link predictor 258 can estimate seeing conditions for a window of time in the future (e.g., a "look-ahead" window of time). The seeing conditions can characterize a quality of a FSO link 202 (e.g., a probability of an upcoming packet drop) between the FSO transceiver 250 and the other FSO transceiver, namely, the FSO transceiver that provided the incoming signal 256. The seeing conditions can be estimated, for example, by identifying periods of high atmospheric scintillation, as described herein. The link predictor 258 can provide data characterizing the window of time to a scheduler 260 that can be coupled to the network port 251.

The scheduler 260 can receive outgoing packets from the network port 251. The outgoing packets can be, for example, packets for a plurality of data streams. The scheduler 260 can store outgoing packets in N number of queues 262 based on QoS parameters of each of the outgoing packets.

The scheduler 260 can include a transmission algorithm that can manage a transmission of packets over the FSO link 202. The transmission algorithm can be a machine learning algorithm (e.g., a genetic algorithm, a neural network, etc.) or a rule based system. The scheduler 260 can examine headers of the data packets in each of N number of queues 262 to determine QoS parameters for each of the N number of packets. Based on the QoS parameters of each packet and seeing conditions of each block of time in the window of time, the scheduler 260 can assign packets from the N number of queues 262 to a block of time in the window of time in a manner illustrated and described with respect to FIGS. 3-6. Moreover, during a given block of time in the window of time, the scheduler 260 can provide an assigned packet to a transmitter 264 of the FSO transceiver 250.

The transmitter 264 of the FSO transceiver 250 can include a modulator 266 that can encode the assigned packet onto a carrier signal to provide a modulated signal. The modulator 266 can provide the modulated signal to a laser diode 268 (or other optical transmitter) of the transmitter 264 that can intensity modulate the modulated signal to output an outgoing signal 270 corresponding to the assigned packet. Thus, over the course of the window of time, a packet for each block of time in the window of time (or some subset thereof) can be output by the laser diode 268.

Additionally, the FSO transceiver 250 can include a communication sensor 271 that has a photodetector 272 (e.g., a photodiode) to receive the incoming signal 256 over the FSO link that has incoming packets encoded thereon. In some examples, the communication sensor 271 can provide the incoming signal 256 to the monitor sensor 252. For instance, the communication sensor 271 can include a beamsplitter 273 to provide a portion of the incoming signal 256 to the photodetector 272 of the communication sensor 271 and another portion of the incoming signal 256 to photodetector 254 of the monitor sensor 254. In some examples, the photodetector 272 of the communication sensor 271 can be the same photodetector 272 as the photodetector 254 in the monitor sensor 252, and in other examples, there can be two (or more) separate photodetectors. The incoming signal 256 can be converted into an electrical signal and provided to a demodulator. The demodulator can demodulate the incoming signal 256 to reconstruct the incoming packets. The incoming packets can be provided to a communication sensor controller 276. The communication sensor controller 276 can store packets in one of K number of buffers 278.

The communication sensor controller 276 can provide the packets stored in the K number of buffers 278 as incoming network packets to the network port 251. The network port 251 can then output the incoming network packets, where the incoming network packets can be routed to the appropriate destination.

Referring back to FIG. 7, in some examples, the first and second transceivers 204 and 206 can be configured to establish a virtual private network (VPN) with only the first and second FSO transceivers 204 and 206 as nodes. In such a situation, data packets transmitted via the FSO link 202 can be encapsulated in a TCP/IP packet, such as a transmission control protocol (TCP) packet, a user datagram (UDP)

packet, etc. In some examples, the first and second transceivers 204 and 206 can be configured to establish a point-to-point link that could be within another network. In still other examples, the packets transmitted over the FSO link 202 can be Ethernet packets.

A first node on the first subnet 208 of a network, namely node (1,A) can establish a bi-directional communication link with a first node on the second subnet 210 of the network, namely node (2,A). In this example, for purposes of simplification of explanation, the address of each node can be a unique two-dimensional identifier that can identify a subnet of the network (e.g., '1' or '2') as well as a node number on the corresponding subnet (e.g., 'A' or 'B'). In other examples, each node address can be implemented in a similar manner (e.g., an IP address) or a different manner.

In one example, packets from node (1,A) to node (2,A) can have a low latency and have a low priority. Thus, the packets transmitted from node (1,A) can have headers indicating parameters of the QoS of the packets from node (1,A) to node (2,A). In one example, the packets from node (1,A) to node (2,A) could be data for controlling a remote desktop. In such a situation, a scheduler of the first FSO transceiver 204 can process the packets from node (1,A) to node (2,A) in a manner similar to the process shown and described with respect to Q-1 illustrated in FIG. 3.

Additionally, a second node on the first subnet 208 of the network, namely node (1,B) can communicate with a second node on the second subset of the network, namely node (2,B). In one example, packets from node (1,B) to node (2,B) can be have a high throughput and have a high priority. Thus, the packets transmitted from node (1,B) can have headers indicating parameters of the QoS of the packets from node (1,B) to node (2,B). In one example, the packets from node (1,B) to node (2,B) could be data for real-time video conferencing. In such a situation, a scheduler of the first FSO transceiver 204 can process the packets from node (1,B) to node (2,B) in a manner similar to the process shown and described with respect to Q-2 illustrated in FIG. 4.

Further, a third node on the first subnet 208 of the network, namely node (1,C) can communicate with a third node on the second subset of the network, namely node (2,C). In one example, packets from node (1,C) to node (2,C) can have a low latency and have a high priority. Thus, the packets transmitted from node (1,C) can have headers indicating parameters of the QoS of the packets from node (1,C) to node (2,C). In one example, the packets from node (1,C) to node (2,C) could be voice data, such as voice over Internet Protocol (VoIP) data. In such a situation, a scheduler of the first FSO transceiver 204 can process the packets from node (1,C) to node (2,C) in a manner similar to the process shown and described with respect to Q-3 illustrated in FIG. 5.

Yet further, a fourth node on the first subnet 208 of the network, namely node (1,D) can communicate with a third node on the second subset of the network, namely node (2,D). In one example, a packets from node (1,D) to node (2,D) can packets with a low jitter and have a mid-priority. Thus, the packets transmitted from node (1,C) can have headers indicating parameters of the QoS of the packets from node (1,C) to node (2,C). In one example, the packets from node (1,C) to node (2,C) could be audio data, such as streaming audio. In such a situation, a scheduler of the first FSO transceiver 204 can process the packets from node (1,C) to node (2,C) in a manner similar to the process shown and described with respect to Q-4 illustrated in FIG. 6.

Upon assigning packets to appropriate blocks of time in the window of time 154, the packets from any of the nodes (1,A), (1,B), (1,C) and (1,D) can be transmitted across the FSO link 202 to the second FSO transceiver 206. The second FSO transceiver 206 can reconstruct the packets and provide the packets to the second subset of the network, such that the nodes (2,A), (2,B), (2,C) and (2,D) can receive and process the packets. Moreover, each of the nodes (2,A), (2,B), (2,C) and (2,D) can provide response packets that can be processed by a scheduler of the second FSO transceiver 206 in a similar manner, thereby providing two-way communication between nodes (1,A), (1,B), (1,C) and (1,D) and nodes (2,A), (2,B), (2,C) and (2,D).

Accordingly, the first FSO transceiver 204 and the second FSO transceiver 206 can control data flow though the FSO link 202 to ensure that the QoS parameters of each packet are met as closely as possible by matching seeing conditions of the FSO link 202 that can vary substantially in real-time. Moreover, as illustrated and described with respect to FIGS. 2-6, the scheduler can adapt to continual changes in the quality of the FSO link 202. By utilization of this system, the negative effects of atmospheric scintillation or other blockages can be reduced.

Figure 9:
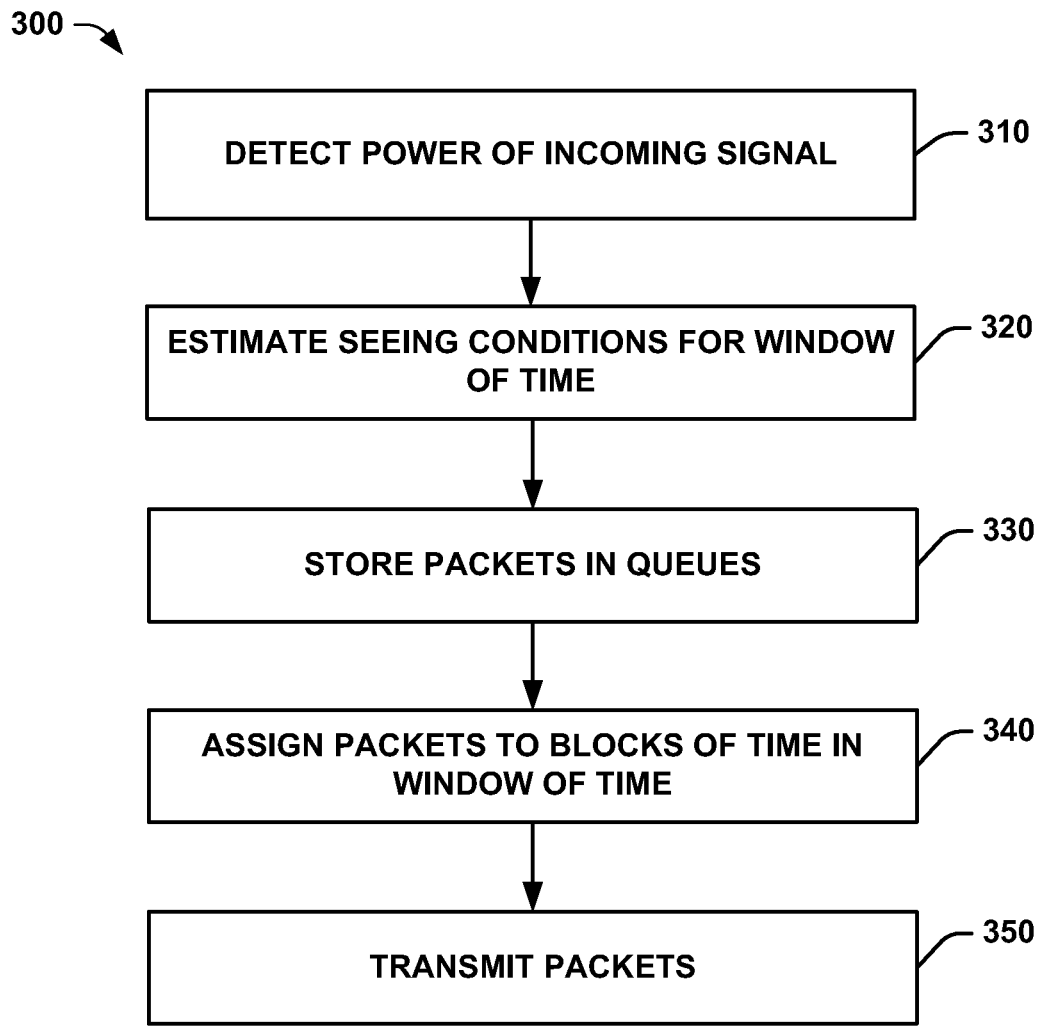
FIG. 9 illustrates a flowchart of an example method for controlling transmission of packets over an FSO link.

In view of the foregoing structural and functional features described above, example methods will be better appreciated with reference to FIG. 9. While, for purposes of simplicity of explanation, the example methods of FIG. 9 are shown and described as executing serially, it is to be understood and appreciated that the present examples are not limited by the illustrated order, as some actions could in other examples occur in different orders and/or concurrently (e.g., in parallel) from that shown and described herein. Moreover, it is not necessary that all described actions be performed to implement a method.

FIG. 9 illustrates an example flowchart of a method 300 for implementing an FSO transceiver (e.g., the first or second FSO transceiver 4 or 6 illustrated in FIG. 1 and/or the FSO 250 illustrated in FIG. 8) that includes an FSO link, such as the system 2 illustrated in FIG. 1 and/or the system 200 illustrated in FIG. 7. At 310 the power (e.g., optical power) of an incoming signal, such as an optical signal with packets encoded thereon, can be detected by a monitor sensor, such as the monitor sensor 252 illustrated in FIG. 8. At 320, seeing conditions for a window of time in the future (e.g., look-ahead window of time) can be estimated by a link predictor, such as the link predictor 258 illustrated in FIG. 8. At 330, a scheduler of the FSO transceiver (e.g., the scheduler 260 illustrated in FIG. 8) can store packets in a one of a plurality of queues, such as the N number of queues 262 illustrated in FIG. 8.

At 340, packets can be assigned to blocks of time in the window of time based on QoS parameters of each packet stored in the plurality of queues as well as the seeing conditions for each block of time in the window of time. The assignment of the packets can be completed by a transmission algorithm (e.g., a transmission schedule algorithm), such as a machine learning algorithm or a rule based algorithm. At 350, the packets can be transmitted across the FSO link to another FSO transceiver.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A free-space optical (FSO) transceiver comprising:
   a link predictor configured to estimate conditions for an FSO link over a window of time in the future; and
   a scheduler configured to assign outgoing packets to blocks of time in the window of time based on quality of service (QoS) parameters of each of the outgoing packets and on conditions estimated for each block of time in the window of time;
   wherein the estimated conditions for a given block of time in the window of time is based on a rate of change of a measured power of an incoming signal received at the FSO transceiver.

2. The FSO transceiver of claim 1, further comprising a transmitter configured to provide an optical signal with the outgoing packets encoded thereon to another FSO transceiver.

3. The FSO transceiver of claim 2, further comprising a monitor sensor configured to provide the measured power of an incoming optical signal to the link predictor.

4. The FSO transceiver of claim 1, wherein the scheduler is further configured to store packets with the same QoS parameters in one of a plurality of queues.

5. The FSO transceiver of claim 4, wherein the scheduler comprises a machine learning algorithm to assign the packets from each of the plurality of queues to the blocks of time in the window of time.

6. The FSO transceiver of claim 4, wherein the scheduler comprises a neural network to assign the packets from each of the plurality of queues to the blocks of time in the window of time.

7. The FSO transceiver of claim 4, wherein the QoS parameters for each packet stored in the plurality of queues characterizes a desired latency and a desired priority of a respective packet.

8. The FSO transceiver of claim 7, wherein the QoS parameters for each packet stored in the plurality of queues further characterizes a desired jitter and a desired throughput of the respective packet.

9. The FSO transceiver of claim 8, wherein the scheduler is configured to assign consecutive packets stored in a given queue of the plurality of queues to non-consecutive blocks of time in the window of time.

10. The FSO transceiver of claim 9, wherein the scheduler is configured to assign a packet stored in another queue of the plurality of queues a block of time in the window of time between the non-consecutive blocks of time in the window of time.

11. The FSO transceiver of claim 1, wherein the conditions of the FSO link vary as a function of atmospheric scintillation in free space traversed by the FSO link.

12. The FSO transceiver of claim 1, further comprising a communication sensor controller configured to store incoming packets provided over the FSO link in a plurality of buffers.

13. A system comprising:
   a first free space optical (FSO) transceiver comprising:
      a link predictor configured to estimate conditions for an FSO link over a window of time in the future;
      a scheduler configured to assign outgoing packets to blocks of time in the window of time based on quality of service (QoS) parameters of each of the outgoing packets and on conditions estimated for each block of time in the window of time; and
      a monitor sensor configured to provide a measured power of an incoming optical signal to the link predictor of the first FSO transceiver, wherein the estimated conditions at the first FSO transceiver for a given block of time in the window of time is based on a rate of change of the measured power of the incoming signal; and
   a second FSO transceiver comprising a scheduler configured to assign another set of outgoing packets to blocks of time in another window of time based on QoS parameters of each of the another set of outgoing packets and on conditions estimated for each block of time in the another window of time.

14. The system of claim 13, wherein the conditions estimated by the scheduler of the second FSO transceiver for the another window of time are based on conditions estimated and provided from the first FSO transceiver via the FSO link or via another link.

15. The system of claim 13, where the second FSO transceiver further comprises a link predictor configured to provide the estimated conditions for the FSO link over the another window of time based on the rate of change of the measured power of the incoming signal at the first FSO transceiver.

16. A system comprising:
   a first free space optical (FSO) transceiver configured to:
      estimate conditions over an FSO link for a window of time in the future, wherein the estimated conditions for a given block of time in the window of time is based on a rate of change of a measured power of an incoming signal received at the first FSO transceiver;
      assign the network packets stored in a plurality of queues, wherein each of the plurality of queues stores network packets from the with the same quality parameters, to blocks of time in the window of time based on the estimated conditions and on quality of service (QoS) parameters of the packets in each of the plurality of queues; and
      transmit the network packets over the FSO link during the window of time; and
   a second FSO transceiver separated by free space from the first FSO transceiver, the second FSO transceiver being configured to:
      receive the network packets transmitted over the FSO link; and
      provide the network packets to a network.

17. The system of claim 16, wherein the second FSO transceiver is further configured to store the network packets in a plurality of buffers prior to providing the packets to the network.

18. The system of claim 17, wherein the first FSO transceiver employs a machine learning algorithm to assign the network packets in the plurality of queues to the blocks of time in the window of time.

19. The system of claim 16, wherein the conditions of the FSO link are based on atmospheric scintillation or internal tracking degradations.

20. A method comprising:
   estimating conditions of a free space optical (FSO) link for a window of time in the future; and
   assigning network packets that are stored in a plurality of queues, wherein each of the plurality of queues stores network packets of the with similar quality parameters, to blocks of time based on the conditions and quality of service (QoS) parameters of the network packets in each of the plurality of queues;

detecting, by a monitor sensor, a power of an incoming signal transmitted over the FSO link, wherein the estimating is based on a rate of change of the power of the incoming signal.

21. The method of claim 20, transmitting, by a transmitter, the network packets stored in the plurality of queues over the FSO link.

* * * * *